United States Patent [19]

Brezillon et al.

[11] Patent Number: 4,689,880
[45] Date of Patent: Sep. 1, 1987

[54] METHOD OF MANUFACTURING A POLYMER-CONSOLIDATED CADMIUM ELECTRODE FOR AN ALKALINE STORAGE CELL, AND AN ELECTRODE OBTAINED BY THE METHOD

[75] Inventors: Jean-Loup Brezillon, Parempuyre; Jean-Michel Dauchier, Martignas sur Jalle, both of France

[73] Assignee: Saft, S.A., Romainville, France

[21] Appl. No.: 890,937

[22] Filed: Jul. 28, 1986

[51] Int. Cl.⁴ .............................................. H01M 4/26
[52] U.S. Cl. ................................... 29/623.5; 429/217; 429/222
[58] Field of Search ....................... 429/217, 222, 241; 29/623.5; 427/123, 126.3, 367, 372.2

[56] References Cited

U.S. PATENT DOCUMENTS 3,888,695 6/1975 Catherino ..................... 429/222 X
4,105,832 8/1978 Sugalski ....................... 429/222 X
4,476,205 10/1984 Menard ......................... 429/222 X
4,563,370 1/1986 Menard ............................... 427/123

*Primary Examiner*—Anthony Skapars
*Attorney, Agent, or Firm*—Kenyon & Kenyon

[57] ABSTRACT

A method of manufacturing a polymer-consolidated cadmium electrode for an alkaline storage cell, the method comprising the steps of:

mixing the following ingredients in water: a gelling agent; cadmium and cadmium oxide in powder form constituting the active material; and a copolymer of carboxylated styrene-butadiene at a concentration lying in the range 0.5% to 3% by weight of active material;

coating the resulting paste on a metal current collector;

drying the coated current collector; and subjecting the resulting assembly to a temperature lying in the range 120° C. to 150° C. for a period of a few minutes in order to cause said polymer to cross-link.

6 Claims, No Drawings

METHOD OF MANUFACTURING A POLYMER-CONSOLIDATED CADMIUM ELECTRODE FOR AN ALKALINE STORAGE CELL, AND AN ELECTRODE OBTAINED BY THE METHOD

The present invention relates to a polymer-consolidated cadmium electrode for an alkaline storage cell.

BACKGROUND OF THE INVENTION

In alkaline storage batteries, the electrodes commonly used are electrodes sintered at high temperature. In some applications, and for reasons of manufacturing cost, cadmium electrodes have appeared which comprise a metal support or current collector onto which an active paste is made to adhere, said active paste containing the active material per se and a binder, e.g., polytetrafluoroethylene. The function of the binder is to enable the active material to be handled in an industrial context without losing any of the active material; in addition, the binder must be entirely stable in the electrolyte used.

American Pat. No. 4,476,205 described dispersing in water a mixture of cadmium oxide together with a binder of the copolymer of carboxylated styrene-butadiene type, with the concentration of the copolymer lying in the range 3.8% to 5% of the mixture when in the dry state. The mixture is dried in order to obtain partial cross-linking of the binder; the resulting product is crushed and metal cadmium powder is incorporated therein. The electrode per se is constituted by calendering the powder mixture onto a grid or a support of expanded metal.

In order to obtain adequate mechanical performance, and to increase the cohesion of the powder which has suffered from partial cross-linking of the binder, it is necessary to apply a very high pressure to the powder mixture. This gives rise to serious drawbacks since the porosity of the active mass is low (at about 15%) and highly non-uniform, thereby hindering electrochemical formation and cadmium reactivity, generally leading to poor operation.

Preferred implementations of the present invention provide a method in which the active paste does contain a binder, but which nevertheless provides a cadmium electrode of good quality both mechanically and electrochemically.

SUMMARY OF THE INVENTION

The present invention provides a method of manufacturing a polymer-consolidated cadmium electrode for an alkaline storage cell, the method comprising the steps of:

mixing the following ingredients in water: a gelling agent; cadmium and cadmium oxide in powder form constituting the active material; and a copolymer of carboxylated styrene-butadiene at a concentration lying in the range 0.5% to 3% by weight of active material;

coating the resulting paste on a metal current collector;

drying the coated current collector; and subjecting the resulting assembly to a temperature lying in the range 120° C. to 150° C. for a period of a few minutes in order to cause said polymer to cross-link.

The present invention also provides an electrode obtained by the above method and having a porosity lying in the range 50% to 60%.

If a subsequent calendering operation is required, the electrode porosity then lies in the range 35% to 45%.

Other characteristics and advantages of this present invention appear from the following description of specific implementations given by way of non-limiting example.

The following ingredients are mixed in water:
active material: CdO+Cd 92% to 97%
additives: 3% to 5%
gelling agent: 0.3% to 3%
copolymer of carboxylated styrene-butadiene: 0.5% to 3%

The additives may, for example, be potassium borate, or a polyvinyl alcohol of nickel or of nickel hydroxide.

The gelling agent may be carboxylcellulose, methocel, or ethylmethylcellulose.

the ingredients are mixed and kneaded, for example, in a planetary type kneader apparatus.

The viscosity of the resulting paste lies in the range $10^5$ to $25 \times 10^5$ centipoises.

The electrode support is a smooth perforated nickel-plated steel sheet having holes with diameters lying in the range 1.1 mm to 2 mm and with a perforation factor lying in the range 40% to 45%.

The active mass is deposited on either side of the support by passing it through a basin containing the active mass paste. The resulting deposit is made uniform by passing through a device having lips at a controlled distance apart.

The strip made in this way is thoroughly dried and then subjected to heat treatment at a temperature lying in the range 120° C. to 150° C. for a period of time in the range of one to five minutes. This treatment ensures that the polymer is cross-linked.

The porosity of the rosulting electrode lies in the range 50% to 60%.

If a subsequent calendering stage is necessary, the porosity of the resulting electrode lies in the range 35% to 45%, which is much higher than the porosity obtained with prior art methods.

Electrodes in accordance with the invention have very good mechanical performance and stand up well to shock and shedding. They are thus non-polluting; and in particular the finely divided metallic oxide which constitutes the active material does not tend to escape while the electrodes are being handled.

Adherence measured in shear improves by a factor of about 3 compared with active pastes which only contain polytetrafluoroethylene.

Naturally, the invention is not limited to the implementations described above. Without going beyond the scope of the invention, any means may be replaced by equivalent means.

What is claimed is:

1. A method of manufacturing a polymer-consolidated cadmium electrode for an alkaline storage cell, the method comprising the steps of:

mixing the following ingredients in water: a gelling agent; cadmium and cadmium oxide in powder form constituting the active material; and a copolymer of carboxylated styrene-butadiene at a concentration lying in the range 0.5% to 3% by weight of active material;

coating the resulting paste on a metal current collector;

drying the coated current collector; and subjecting the resulting assembly to a temperature lying in the range 120° C. to 150° C. for a period of a few minutes in order to cause said polymer to cross-link.

2. A method according to claim 1, wherein the gelling agent is at a concentration lying in the range 0.3% to 3% by weight.

3. A method according to claim 1 or 2, wherein an additional calendering operation is performed on said electrode.

4. A cadmium electrode obtained by the method according to claim 1, wherein the porosity of the electrode lies in the range 50% to 60%.

5. A cadmium electrode obtained by the method according to claim 3, wherein the electrode has a porosity lying in the range 35% to 45%.

6. An electrode according to claim 4 or 5, wherein said metal current collector is a smooth sheet of perforated nickel-plated steel, with holes having a diameter lying in the range 0.1 mm to 2 mm and with the perforations occupying 40% to 45% of the area of the electrode.

* * * * *